E. W. PAULSON.
CORN PLANTER.
APPLICATION FILED SEPT. 29, 1916.

1,300,641.

Patented Apr. 15, 1919.
2 SHEETS—SHEET 1.

Inventor
E. W. PAULSON

Milton S. Crandall,
Attorney

E. W. PAULSON.
CORN PLANTER.
APPLICATION FILED SEPT. 29, 1916.
1,300,641.
Patented Apr. 15, 1919.
2 SHEETS—SHEET 2.
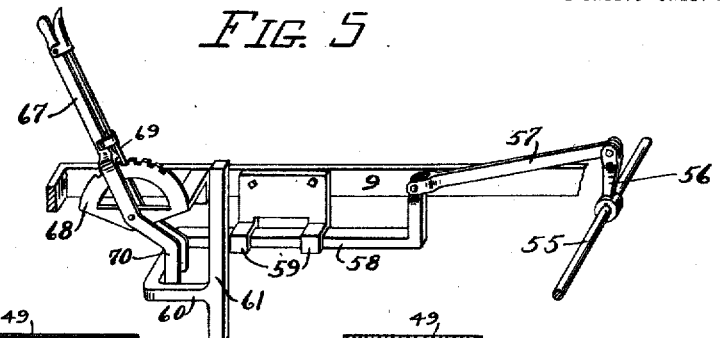
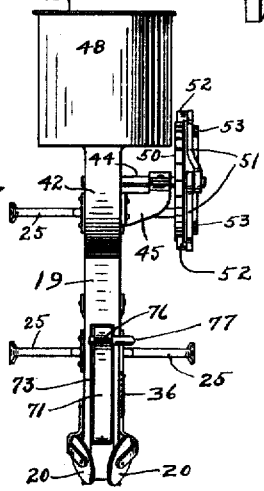
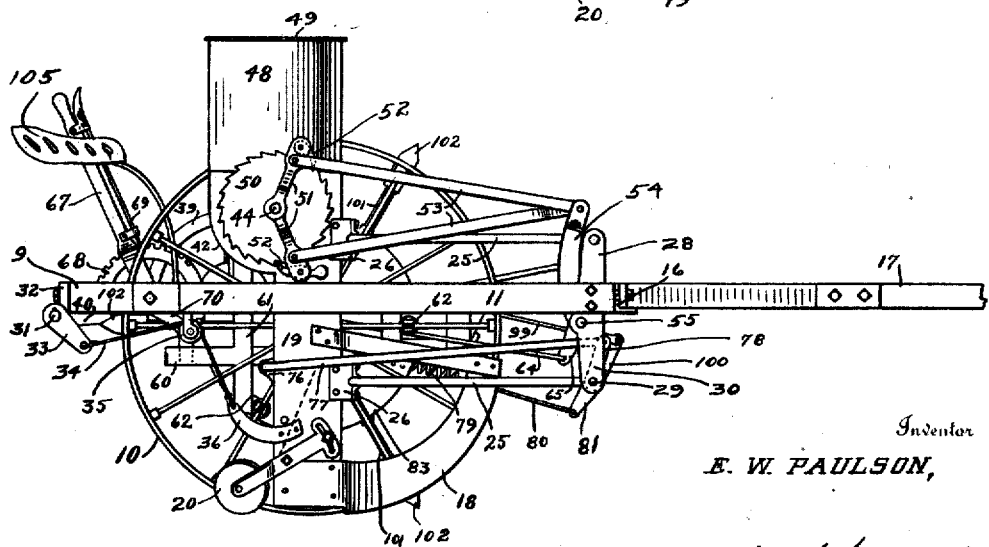
Inventor
E. W. PAULSON,
Milton S. Crandall
Attorney

UNITED STATES PATENT OFFICE.

ERNEST W. PAULSON, OF OTOE, IOWA.

CORN-PLANTER.

1,300,641.  Specification of Letters Patent.  Patented Apr. 15, 1919.

Application filed September 29, 1916. Serial No. 122,924.

*To all whom it may concern:*

Be it known that I, ERNEST W. PAULSON, a citizen of the United States, and a resident of Otoe, in the county of Woodbury and State of Iowa, have invented certain new and useful Improvements in Corn-Planters, of which the following is a specification.

The present invention relates to corn-planters and has for its primary object the production of an improved wireless corn-planter.

Another object of the invention is the production of a corn-planter embodying improved seed dropping mechanism.

A further object of the invention is the production of an improved corn-planter adapted to be operated without a check wire and embodying means conveniently controlled by the driver for regulating the number of seed planted.

Still another object of the invention is the production of a wireless corn-planter embodying improved means actuated by the travel of the machine for governing the seed dropping mechanism.

With these and other objects in view, the invention, consisting in the construction, combination and novel arrangement of parts, will be fully understood from the following description, reference being had to the accompanying drawings, which form a part of this application and in which like characters of reference indicate corresponding parts throughout the several views, of which,—

Fig. 2 is a side elevation of the same;

Fig. 3 is a rear elevation of one of the planting mechanisms;

Fig. 4 is a vertical section of the same; and

Fig. 5 is a perspective view of the hopper controlling means.

Figure 1:
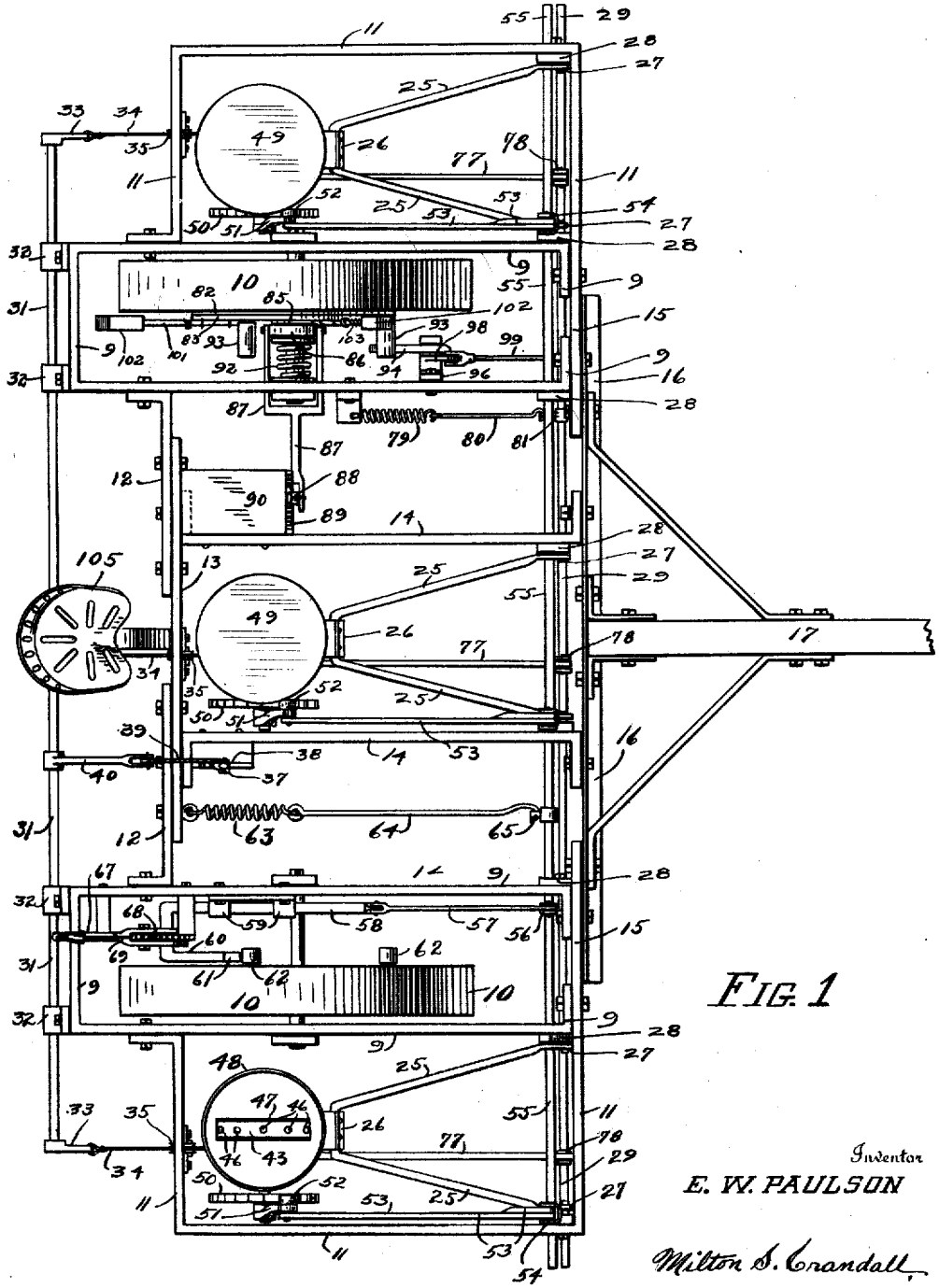
Figure 1 is a plan of a corn-planter constructed in accordance with the invention, one of the hopper covers being removed.

Although I have illustrated and hereinafter described the preferred embodiment of the invention, I would not be understood as being limited to the specific structure chosen for illustration for it will be apparent that various alterations and modifications may be made without departing from the spirit and scope of the invention as defined in the appended claims.

The specific frame construction, hilling mechanism and seed dispensing mechanism, disclosed herein, form respectively, the subjects-matter of my copending applications, Nos. 179,031; 179,032 and 179,033 all filed July 6, 1917; while the specific earth-marking mechanism presented, is covered in my application 183,422 filed July 30, 1917. The claims of the present application are confined to the general novelty of the structure.

Referring, now, to the illustrations the main frame of the present embodiment is rectangular in general contour and adapted to travel in parallelism with its minor axis. The machine is designed to plant three rows simultaneously, one seed dropper mechanism being located in the center of the main frame and the others in the sides thereof. In order that the distances between the rows may be varied to suit the choice of the operator the main frame preferably consists of two rectangular frames, 9, which inclose and are supported by travel wheels, 10. On the outer sides of the frames, 9, are secured rectangular frames, 11, and on the inner sides of the frames, 9, are secured arms, 12, which overlap and are bolted to the rear cross member, 13, of an intermediate frame, 14.

The front cross members of the frames, 11, are extended as at 15, and are bolted or otherwise secured to the inwardly turned ends of the frames, 9. The intermediate frame and the extensions, 15, are bolted to an angle iron draw bar, 16, having secured centrally thereto a suitable tongue, 17, to which the draft animals may be hitched.

It will thus be understood that the frame may be extended or narrowed to accordingly increase or decrease the distances between the rows by unbolting the rear overlapping frame members and the extension members, 15, from the angle iron, 16, and then rebolting said members when the proper adjustment has been obtained.

The said planting mechanisms each include the usual upwardly curved furrow opening runner, 18, secured at its rear end to an upright chute, 19, at the rear of which is mounted a pair of disks, 20, inclined rearwardly and from each other and serving to close the furrow after the seeds have been dropped therein.

The seed dropping mechanism is supported by a pair of vertical swinging frames positioned one above another and consisting of rods, 25, having their intermediate portions journaled in suitable bearings, 26, mounted on the forward side of the chute and their end portions bent forwardly. The ends of the rod forming the upper frame, 25, are pivoted as at 27, on the bearings, 28, rising from the main frame; and the ends of the rod forming the lower frame 25, are pivoted on a shaft, 29, rotating in bearings, 30, formed integrally with the bearings, 28, and depending from the main frame.

By virtue of this construction it is evident that the seed dropping mechanism is held at all times, securely in upright position yet it is free to move vertically to accommodate itself to unevenness of the earth's surface and also to permit the seed-dropping mechanism to be raised when desired.

The seed dropping mechanisms are raised and lowered by means of a rock-shaft, 31, journaled in suitable bearings, 32, mounted on the rear of the main frame and having forwardly-extending arms 33, on which are secured flexible links, 34, passing over suitable direction pulleys, 35, mounted on the main frame; and connected to arms, 36, mounted on the chutes of the seed-dropping mechanisms.

The shaft, 31 is controlled by a lever, 37, fulcrumed on a suitable quadrant, 38, mounted on the main frame; and connected by a rearwardly and downwardly curved link, 39, with an arm 40, carried by the shaft 31.

It is now evident that rearward movement of the lever, 37, will coact with the shaft, 31, and links, 34, to simultaneously raise the seed dropping mechanisms. The seed dropping mechanisms may be held in their elevated positions while the machine is traveling from place to place, by engagement of the pawl, 41, with the notched quadrant, 38.

The upper portion of the chute, 19, is enlarged as at 42, to inclose a seed feeding-wheel, 43, fixed on a shaft, 44, extending laterally through the chute and journaled in suitable bearing 45, mounted on the side of the chute. The seed feeding wheel is provided with equally-spaced peripheral recesses, 46, each adapted to receive a kernel of corn. The seed feeding wheel extends through a slot, 47, in the bottom of the seed hopper, 48, supported by the chute and provided with a suitable cover, 49.

On the shaft, 44, is fixed a ratchet-wheel, 50, and freely mounted oppositely disposed radial arms, 51, carrying dogs, 52, engageable with the ratchet-wheel.

The arms, 51, of the feeding mechanisms, are connected by drive rods, 53, with crank arms 54, carried by a rock-shaft, 55, journaled in the bearings, 30. The rock-shaft 55, is actuated by a crank arm, 56, extending upwardly from the shaft, 55, and connected by a link, 57, with a bar, 58, slidable forwardly and rearwardly in suitable bearings, 59, mounted on the main-frame. The rear end of the bar, 58, is formed with a hook, 60, having an upright, 61, the forward side of which is engageable by friction rollers, 62, on the side of the adjacent travel-wheel.

Although in the present embodiment, three of these friction rollers, 62, are arranged at equally spaced intervals on the sides of the travel wheel, the number may be varied to suit the size of the travel-wheel and the length of the stroke of the ratchet-driving members, as will presently appear.

It is now evident that rotation of the travel-wheel forces the hooked bar, 58, rearwardly, to coact with the rock-shaft, 55, to drive the ratchet members rearwardly and cause the lowermost of the clogs, 52, to rotate the ratchet-wheels, 50. After the bar, 58, and its associated parts have been forced to the extremity of their rearward strokes they are reciprocated by suitable means as the retracting spring, 63, secured to the rear of the main frame and connected by a link, 64, with a crank-arm, 65, depending from the rock-shaft, 55. The reciprocation of the said rock-shaft causes the uppermost of the dogs, 52, to continue the rotation of the ratchet-wheels, 50. Retrograde movement of the ratchet mechanism is prevented by suitable detents, as torsion springs, 66, each having one end secured to the inner side of the chute and engageable at its other end with the feeding wheel, 43. Each seed-feeding wheel moves intermittently uniform distances, whereby like numbers of seeds are deposited in the chute by each stroke of the actuating members.

In order to conveniently and accurately vary the number of seeds planted I provide suitable means for limiting the stroke of the drive-bar, 58, which means may consist of a suitable lever 67, (Fig. 5,) fulcrumed on the main-frame and provided with a suitable detent, 69, engageable with the quadrant.

The lever is extended below the fulcrum as at, 70, to engage the inner or forward side of the hooked portion of the bar, 58. Thus by adjusting the lever forwardly or rearwardly the stroke of the drive member, 58, is accordingly shortened or lengthened. The lever, 67, also serves as means for de-energizing the seed-dropping mechanism, when desired, by withdrawing the upright, 61, completely out of the path of the roller, 62.

The seeds are dropped from the feeding-wheels onto suitable gates which normally close the chutes. The gates preferably consist of V-shaped blocks or plates, 71, interposed between the side walls of the chutes and having their intermediate portions pivoted therein, as at 72. The gates swing forwardly and rearwardly through rear openings, 73, in the chutes. The upper forward corners of the gates are engaged normally with the front walls of the chutes and the said front walls may be provided with shoulders, 74, under which the said corners of the gates may pass to facilitate positive closing of the chutes and yet obviate accurate individual adjustment of the gates or its actuating members. Between the faces of the gates and the front walls of the chutes are passages, 75. Therefore, when the gate is swung rearwardly as indicated by broken lines, in Fig. 4, the seeds deposited upon the gates are dropped into the passages, 75.

In the embodiment illustrated, the apexes of the gates are so formed as to engage the front walls of the chutes when the gates are swung rearwardly, whereby the seeds are retained in the spaces, 75, and not dropped into the furrow until the gates reciprocate.

The gates are provided at their rear with ears, 76, to which are pivoted connecting rods, 77, having their forward ends connected to crank-arms, 78, secured to the rock-shaft, 29. The gates are held yieldably closed by means of a retracting-spring, 79, suitably secured to the main-frame and connected by a link, 80, with a crank-arm, 81, depending from the shaft, 29.

The gates are opened by means of trip mechanism operating in conjunction with the travel-wheel opposite that which controls the hopper mechanism; and acting to force the drive-rods, 77, rearwardly.

Referring, now, more particularly to Figs. 1, 6, and 7, the gate-operating mechanism consists preferably of a clutch consisting of a disk, 82, fixed on the side of and coaxially with the travel wheel. The fixed disk is adapted for frictional engagement with a similar disk, 83, having a hub, 84, mounted freely on the axle of the wheel, 10. The said hub is provided with an annular groove, 85, within which is mounted a free collar, 86, connected by a forked link, 87, with a lever, 88, fulcrumed on a suitable quadrant, 89, carried by a bracket, 90, mounted on the main-frame. The lever is provided with a pawl, 91, engageable with the quadrant. The disk, 83, is held normally in engagement with its companion by means of a compression-spring, 92, interposed between the hub and the adjacent main frame member.

On the face of the free disk are mounted equally spaced friction rollers, 93, corresponding in number to the rollers, 62, on the opposite travel-wheel. As the machine moves forwardly the friction-rollers, 93, engage the upper side of a trip-lever, 94, fulcrumed, as at 95, on a suitable bearing, 96, mounted on the main frame. In order that operation of the lever, 94, by rearward movement of the machine, will have no effect on its associated parts, the said lever is provided with an upwardly-inclined heel, 97, which engages the front side of a crank-arm, 98, mounted coaxially with the pivot, 95. The said crank arm is connected by a link, 99, with a crank-arm, 100, on the shaft, 29.

It is now evident that the coöperation of the friction-rollers 93, with the trip levers, 94, causes the gates to open and release the seeds as previously set forth.

In order to facilitate the drivers alining the first hill of each new row with the corresponding hills of the adjacent rows; and for facilitating the correction of the lateral alinement during the progress of planting a row, the free disk, 83, is provided with radial arms, 101, provided with heads, 102, adapted to indent the earth as the machine travels, the said arms and rollers, 93, being so related that a mark will be left in the earth by the arms, coincident with dropping the seeds, whereby lateral alinement of the hills may be supervised.

By operation of the clutch lever, 88, the free clutch may be disengaged from its companion when rotation of said disk is undesired as when the machine is traveling from place to place and it is not desired to operate either the planting mechanism or the markers. It is evident that the clutch members may also be disengaged to permit the driver to so adjust the free clutch member that the first hill of each new row may be accurately and conveniently alined with the corresponding hills of the adjacent rows. This construction also enables the operator to keep constant check and correct the alinement of the hills as the operation of planting a row progresses.

On the rear of the main-frame is mounted a driver's seat, 105.

A serious defect common to all wireless corn-planters heretofore presented, of which I have knowledge, is that the supporting wheels which actuate the planting mechanism, are positioned to travel in line with the furrow-opening means. The earth at this point is loose and moist and adheres to the wheels, thereby preventing accurate checking of the hills.

This defect I have overcome as the path of the wheels is where the earth is the driest.

Having thus described my invention what I claim as new and desire to secure by Letters Patent of the United States, is,—

1. In a corn-planter, a traveling frame, two rotatable members actuated by travel of the frame, a seed hopper, a valved chute to receive seeds from the hopper and drop them to the ground, mechanism actuated by one of said members for feeding seeds from the hopper to the chute, and means actuated by the other of said members for opening and closing the valved chute to permit dropping the seeds.

2. In a corn-planter, a traveling frame, two studded rotatable members actuated by travel of the frame, a seed hopper, a valved chute to receive seeds from the hopper and drop them to the ground, means movable intermittently to feed seeds from the hopper to the chute, a reciprocating member actuated by engagement with the studs of one of said members to actuate said means, and means actuated by the other of said studded members to open the valved chute to permit dropping the seeds.

3. In a corn-planter, a traveling frame, two studded rotatable members actuated by travel of the frame, a seed hopper, a valved chute to receive seeds from the hopper and drop the same to the ground, means movable intermittently variable distances to feed variable numbers of seeds from the hopper to the chute, a reciprocating means actuated by engagement with the studs of one of said members to actuate said means, means for regulating the stroke of the reciprocating means to vary the movement of said first means, and means actuated by the other of said studded members to open the valved chute to permit dropping the seeds.

4. In a corn-planter a frame, two independently rotating travel wheels, a plurality of planting mechanisms arranged transversely of the frame and each including a seed hopper, a valved chute to receive seeds from the hopper and drop the same to the ground, means actuated by one of the wheels for feeding seeds from the hoppers to the chutes, and means actuated by the other wheel for opening the valved chutes to permit dropping of the seeds.

5. In a corn-planter, a frame, two independently rotating travel wheels, a plurality of planting mechanisms arranged transversely of the frame and each including a seed hopper, a valved chute to receive seeds from the hopper and drop the same to the ground, means actuated by one of the wheels for feeding seeds from the hoppers to the chutes, a clutch member fixed to turn with the other wheel, a studded free clutch member engageable with said first clutch member, and means actuated by engagement with said first clutch member to govern the valved chutes.

6. In a corn-planter, a frame, two independently rotating travel wheels, a seed planting mechanism including a seed hopper; a valved chute to receive seeds from the hopper and drop the same to the ground, means actuated by one of said wheels for feeding seeds from the hopper to the chute, and means actuated by the other of said wheels for controlling the valved chute.

7. In a corn-planter, a traveling frame, two independently rotating members actuated by travel of the frame, a seed hopper, a valved chute to receive seeds from the hopper and drop the same to the ground, means operated intermittently by one of said members to feed seeds from the hopper to the chute, and means operated by the other of said members to intermittently open the valved chute, the latter member being adjustable to cause the latter means to operate at any chosen intervals with respect to the travel of the frame.

8. A corn-planter including a main-frame, a traveling-wheel, a plurality of seed-dropping members arranged transversely of the main-frame and each including an upright chute, a furrow-opening means carried thereby, a seed-hopper, and a wheel rotatable in a vertical plane and operable to feed the seeds into the chute from the hopper, and means for actuating the feeding-wheels including ratchet-wheels fixed coaxially with the feeding-wheels, dogs to drive the ratchet-wheels, a crank-armed rock-shaft, driving connections between the dogs and the crank-arms, studs carried by the traveling wheel, a reciprocating part actuated by engagement with said studs, and a driving connection between said part and the rock-shaft.

9. A corn-planter including a main-frame, a traveling-wheel, a plurality of seed-dropping members each including an upright chute, a furrow-opening means carried thereby, a seed-hopper, and a wheel rotatable in a vertical plane and operable to feed the seeds from the hopper into the chute, and means for actuating the feeding-wheels including ratchet-wheels fixed coaxially with the feeding-wheels, dogs to drive the ratchet-wheels, a crank-armed rock-shaft, driving connections between the dogs and the crank-arms, studs carried by the traveling wheel, a reciprocating part adapted to be placed in and out of the path of the studs, and actuated by engagement with the studs, a driving connection between said part and the rock-shaft, and means for placing said part in and out of the path of the studs.

10. A corn-planter including a main-frame, a traveling wheel, and seed-dropping mechanism, having means movable variable distances to accordingly vary the number of seeds dropped, a rock-shaft operative to actuate said means, and means for actuating the rock-shaft, including studs on the traveling wheel, a reciprocating part adapted to be placed variable distances in the path of, and actuated by engagement with the studs, means for placing said part variable distances in the path of the studs, and driving connection between said part and the rock-shaft.

In testimony, whereof, I have hereunto set my hand this 25 day of September, 1916.

ERNEST W. PAULSON.